(12) United States Patent
Stephens et al.

(10) Patent No.: US 6,780,247 B2
(45) Date of Patent: Aug. 24, 2004

(54) MODULAR POWDER COATING BOOTH

(75) Inventors: John W. Stephens, Columbia Station, OH (US); Donald L. Urig, Elyria, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/163,697

(22) Filed: Jun. 6, 2002

(65) Prior Publication Data

US 2003/0024218 A1 Feb. 6, 2003

Related U.S. Application Data

(60) Continuation-in-part of application No. 10/100,832, filed on Mar. 18, 2002, now Pat. No. 6,514,305, which is a division of application No. 09/558,504, filed on Apr. 26, 2000, now Pat. No. 6,419,720.

(51) Int. Cl.[7] ................................................. B05B 1/28
(52) U.S. Cl. ..................... 118/326; 55/454; 55/DIG. 46; 454/53
(58) Field of Search ........................... 55/484, DIG. 46; 118/326; 454/53

(56) References Cited

U.S. PATENT DOCUMENTS

| | | | |
|---|---|---|---|
| 3,942,420 A | * | 3/1976 | Marino ........................ 454/51 |
| 4,704,953 A | | 11/1987 | Wilson |
| 4,871,380 A | | 10/1989 | Meyers |
| 4,928,624 A | | 5/1990 | Overton, Jr. |
| 4,932,354 A | * | 6/1990 | Kistner ....................... 118/305 |
| 5,261,934 A | | 11/1993 | Shutic et al. |
| 5,306,332 A | | 4/1994 | Allen |
| 5,788,728 A | | 8/1998 | Solis et al. |

FOREIGN PATENT DOCUMENTS

DE 3406464 A1 9/1985

OTHER PUBLICATIONS

Nordson Corporation Brochure No. PWL–99–505, Jun. 1999, titled Econo–Coat® Series II Powder Coating System.
Nordson Corporation Brochure No. PWL–98–745, Jan. 1998, titled Versa–Coat® Batch and Conveyor Booths.
Nordson Corporation Manual No. 38–10, Apr., 1995.
Nordson Corporation Brochure No. PWL–99–505, Jun. 1999, titled Econo–Coat® Series II Powder Coating System.
Nordson Corporation Brochure No. PWL–98–745, Jan. 1998, titled Versa–Coat® Batch and Conveyor Booths.
Nordson Corporation Manual No. 38–10, Apr. 1995.
Nordson Corporation Brochure No. PWL–94–745, Feb. 1995, titled Versa–Coat® Batch and Conveyor Booths.

* cited by examiner

Primary Examiner—Robert A. Hopkins
(74) Attorney, Agent, or Firm—Calfee, Halter & Griswold, LLP (57) ABSTRACT

A modular powder recovery apparatus includes a base unit, one or more cartridge filters, and a wrapper that at least partially encloses the cartridge filters. The wrapper is designed to allow additional wrappers to be vertically stacked thereon to increase the overall height of the wrapper, thus permitting additional filter capacity without changing the base unit. The base unit is modular in design so that the size of the apparatus may be increased with a minimum of cost and waste.

6 Claims, 11 Drawing Sheets

MODULAR POWDER COATING BOOTH

RELATED APPLICATIONS

This application is a continuation-in-part of U.S. patent application Ser. No. 10/100,832, filed Mar. 18, 2002 now U.S. Pat. No. 6,514,305, which is a divisional application having priority to U.S. patent application Ser. No. 09/558,504, filed Apr. 26, 2000 now U.S. Pat. No. 6,419,720, the entire disclosures of which are fully incorporated herein by reference.

TECHNICAL FIELD OF THE INVENTION

The present invention relates generally to spray booths for powder spraying applications. More particularly, the invention relates to powder collection and containment systems used with powder spray booths.

BACKGROUND OF THE INVENTION

Powder spraying is often used to apply a powder coating material to an article. Various spray technologies may be used including many electrostatic and non-electrostatic techniques. In most powder spraying operations, a significant amount of powder overspray is produced, meaning powder that is directed at the article but does not adhere to the article. Even with spray technologies that have a high transfer ratio, significant amounts of powder overspray may be produced.

The presence of powder overspray typically necessitates the use of a spray booth. A spray booth is used to contain or confine the powder overspray within a partially enclosed area. The spray booth may also be equipped with powder collection and recovery systems. Powder containment and collection are especially important for manual spraying operations wherein an operator is usually in relatively close proximity to the powder spray.

Spray booths can vary substantially in size depending on the articles being sprayed and the quantity of articles being sprayed. Some spray booths are conveyorized to permit automatic transfer of the articles into and through the booth.

A known spray booth design for containing and recovering powder uses cartridge filters and containment airflow. Such a system is sold by NORDSON® Corporation, Amherst, Ohio under the name ECONO-COAT® and VERSA-COAT® powder coating systems. The powder recovery system includes a series of vertically oriented cartridge style filters along one or more walls of the spray booth. A fan is used to create a substantial airflow within the booth. This airflow entrains the powder overspray. The fan draws the powder-laden air through the cartridge filters and exhausts the filtered air to the plant through a second set of filters called final filters. Powder collects on the cartridges, and the cartridges may be cleaned by applying a reverse pulse of air that knocks the powder off the cartridges to the collector base or booth floor. The motor fan, final filters and cartridge filters are assembled into a scaled housing to form a powder recovery module that can be mounted to a spray booth.

A significant limitation of such known systems, however, is that each powder recovery module is uniquely designed for a specific spray booth size. For example, for a given size booth, a fan and associated fan drive motor is used to produce an adequate air flow to contain the powder and draw the powder entrained air into the filters. The number and size of the cartridge filters are also determined by the size of the spray booth and required airflow to contain and recover the powder. Thus, for a given size spray booth, a powder recovery module is designed and fixed in terms of its air handling capacity. Although it is possible to add more modules for larger booths, this technique is not particularly efficient for smaller increases in spray booth size.

Another limitation of the known cartridge type recovery system is that to make a color change requires an extensive cleaning operation. While the filters are easy to replace, the associated housing and wrappers need to be cleaned prior to using a new powder color in the booth.

The need exists therefore for a more flexible and preferably modular cartridge-type powder recovery system that can have capacity added as the spray booth size increases. Such a design preferably will facilitate, if required, efficient color change operations.

A related problem with previous systems manifests itself when a spray booth owner develops a need for a larger booth. In the past, an increase in booth size has required the purchase of an entirely new booth, including all components: floor, walls and ceiling. Even if the old booth components were still serviceable, which many times was the case, the components nonetheless typically were discarded because the owner had no use for them except as a spray booth. Thus there is a need for a spray booth design which allows an increase in booth size without requiring replacement of existing components with new components. Such a design also will reduce the costs associated with increasing booth size.

Also, booth components can become damaged. Damage may occur, for example, when an article being sprayed falls down or is tipped over and crashes against a wall. This can crack the wall, requiring replacement to avoid powder escaping from the booth through the crack. In the past this has required replacement of the entire booth component which was damaged. Thus there is a need for an improved booth design which would allow more localized replacement of damaged booth components. This reduces the costs and waste associated with replacing damaged booth components.

SUMMARY OF THE INVENTION

In accordance with the invention, a powder recovery apparatus for a spray booth is provided that is modular in design to facilitate modifying the apparatus for increased or decreased air and filter capacity when the associated spray booth volume is changed. The modular design includes a base housing that encloses a motor driven fan wheel and one or more final or secondary filters. Vertically mounted on the base are one or more cartridge-style filters through which powder-laden air is drawn down into the base from the spray booth. In accordance with one aspect of the invention, the cartridges are partially surrounded by a wrapper that extends vertically to a height just above the cartridges. The wrapper is constructed such that additional wrappers may be vertically stacked to accommodate larger cartridges without having to modify the base. When the spray booth is increased in size, a larger motor and fan wheel or additional final filters may be installed when necessary in the same modular base.

In accordance with another aspect of the invention, the cartridge filters are arranged within a modular wrapper structure that is installed as a complete unit in a base. The modular cartridge assembly thus facilitates faster and easier color changes.

Still a farther aspect of the invention provides a fan cone in the base between the fan wheel and the air inlets to the base from the cartridges. The fan cone provides a transition air flow path such that the size of the fan wheel can be changed and easily interfaced to the air inlet without having to modify the base structure.

In a yet further aspect of the invention, a mobile modular spray booth is provided. This reduces the cost and waste associated with increasing booth size or replacing damaged booth components.

These and other aspects of the present invention will be fully explained and understood from the following detailed description of exemplary embodiments of the invention in view of the accompanying drawings.

DETAILED DESCRIPTION OF THE INVENTION

Figure 1:
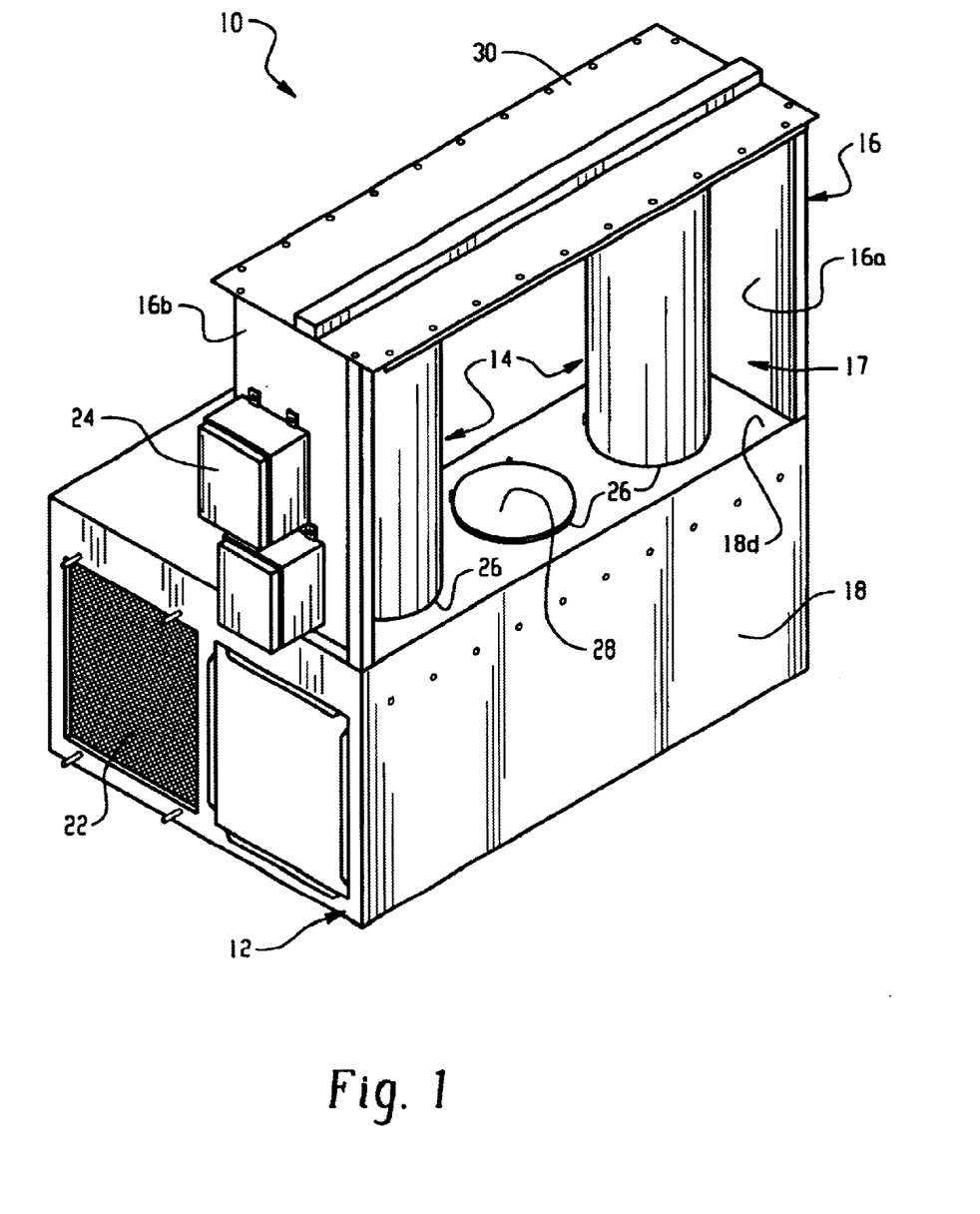
FIG. 1 is an isometric illustration of a modular powder recovery apparatus for a smaller size spray booth in accordance with the invention.

With reference to FIG. 1, an embodiment of a modular powder recovery apparatus 10 is illustrated. Although the invention is shown and described herein with reference to specific configurations of the powder recovery apparatus and spray booths, including size and shape, such descriptions are intended to be exemplary in nature and should not be construed in a limiting sense. Those skilled in the art will readily appreciate that the present invention may be realized in many different forms and configurations of spray booths, cartridge fillers and so forth. The present invention is more broadly directed to the idea of providing a modular powder recovery apparatus that can be easily modified to accommodate different airflow and powder filtering requirements when the associated spray booth size is changed.

The basic modular powder recovery apparatus includes a base unit 12, one or more cartridge-style filters 14 and a wrapper 16. The wrapper 16 partly encloses the cartridges 14 and forms part of the spray booth structure when assembled thereto. Although cartridge-type filters are illustrated in the described embodiments, any filter arrangement may be used with the present invention as part of the modular apparatus 10.

Figure 6:
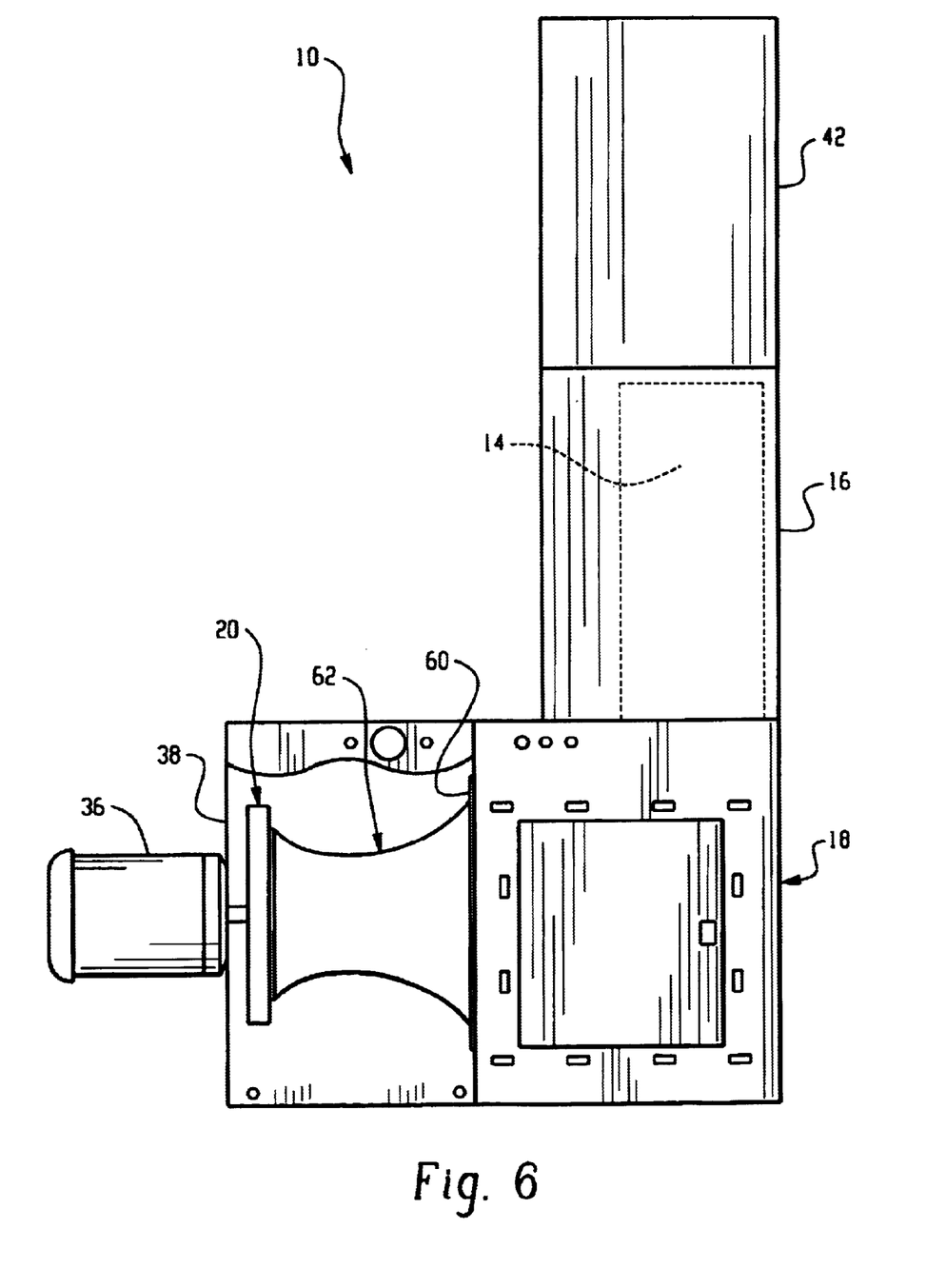
FIG. 6 illustrates a fan cone feature of the present invention.

The base unit 12 includes a housing 18 that encloses a motor driven fan wheel 20 (see FIG. 6). The fan wheel 20 draws air from the spray booth into the cartridge filters 14 and down into the interior of the base housing 18. The powder-laden air is primarily filtered by the cartridge filters 14, but one or more secondary or final filters 22 may be used to filter the air prior to exhausting the air to the plant. An electric control box 24 may be provided for an on/of switch, circuit breaker and so forth in a conventional manner.

In the embodiment of FIG. 1, the base housing 18 has a series of three openings 26 that may receive and support a respective vertically aligned cartridge filters 14. In this example, only two of the three filter opening 26 are used, with the third being covered by a cover plate 28. The number of filters 14 actually used will be determined by the air flow required to contain the powder in the booth and the amount of overspray that is typically incurred for a particular spraying operation.

Figure 3:
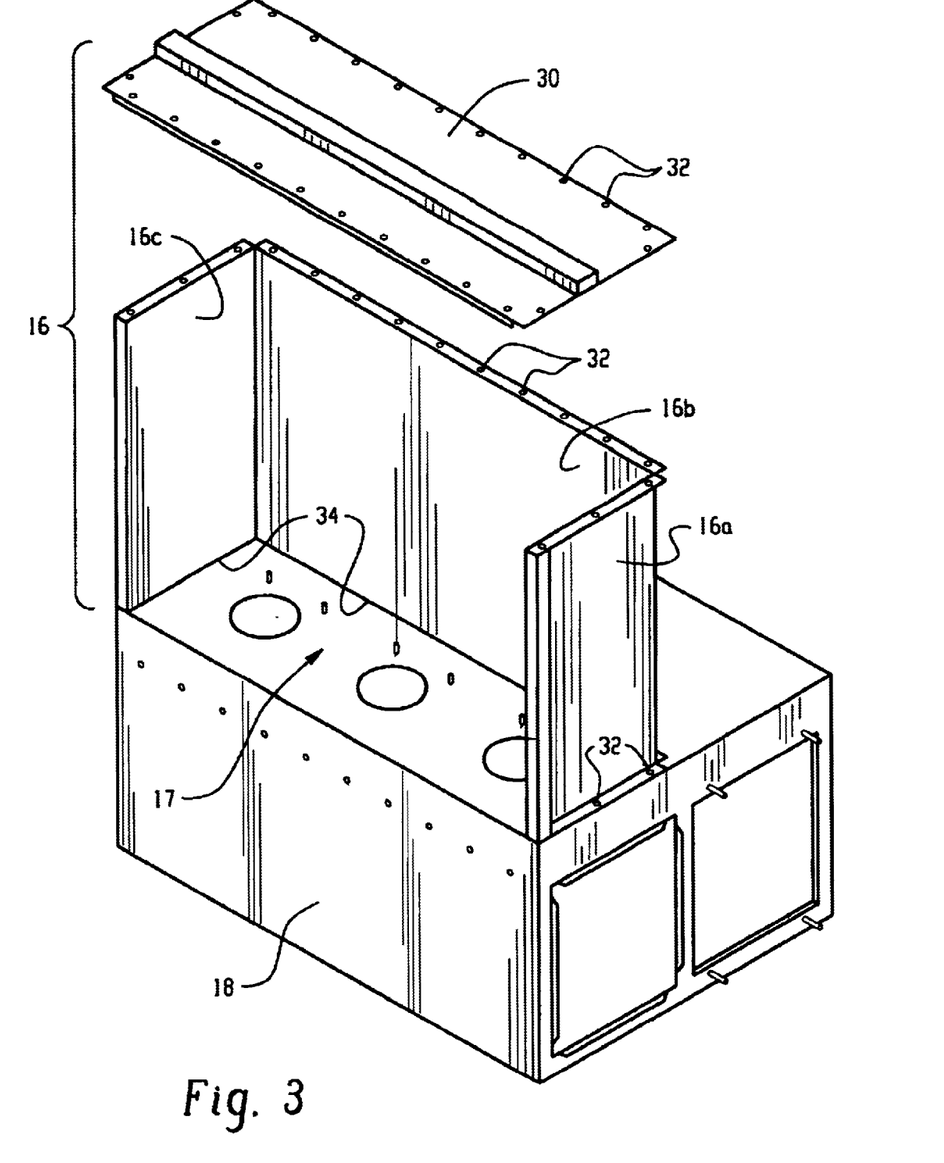
FIG. 3 is a partially exploded view of the apparatus of FIG. 1 with the filters omitted.

FIG. 3 is a partially exploded view of the apparatus of FIG. 1 with the cartridge filters removed for clarity to illustrate details of the wrapper 16. The wrapper 16 is used to partially enclose the filters 14, and in effect form a filter bay 17 that is part of the spray booth enclosure when the apparatus 10 is mounted to a spray booth. The wrapper 16 is made of any suitable material such as stainless steel, galvanized steel, other suitable metals, as well as non-metallic material such as, for example, polypropylene.

The wrapper 16 in the illustrated embodiment is a three walled structure 16a, 16b and 16c, with a removable top 30. A series of bolt holes 32 are provided along the various perimeters so that the wrapper 16 can be securely mounted on top of the base housing 18, and the top 30 installed thereon (FIG. 1). In order to maximize airflow into the cartridge filters 14, the various joints 34 may be caulked or otherwise sealed. Any suitable technique may be used to install the wrapper 16 on the base housing 18.

Figure 4A:
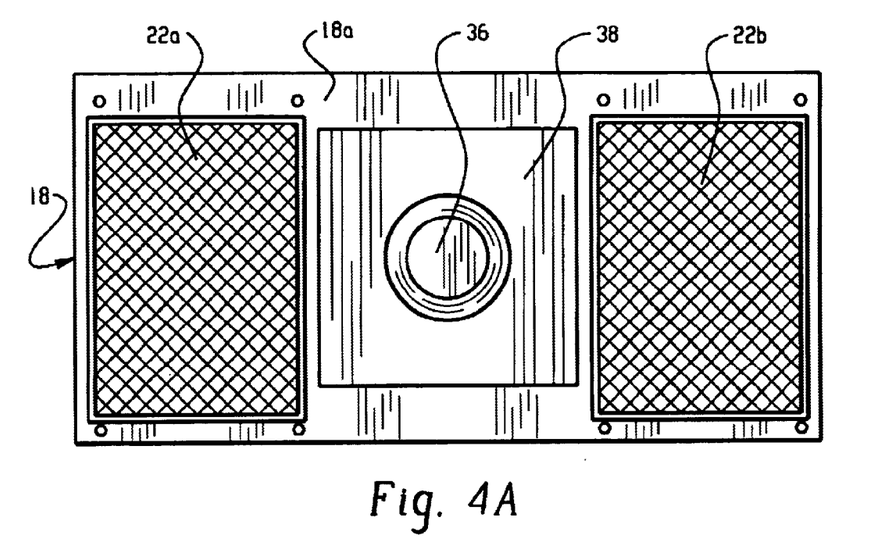
FIGS. 4A and 4B illustrate respectively rear and side views of a base unit for the apparatus of FIGS. 1 and 2.
Figure 4B:
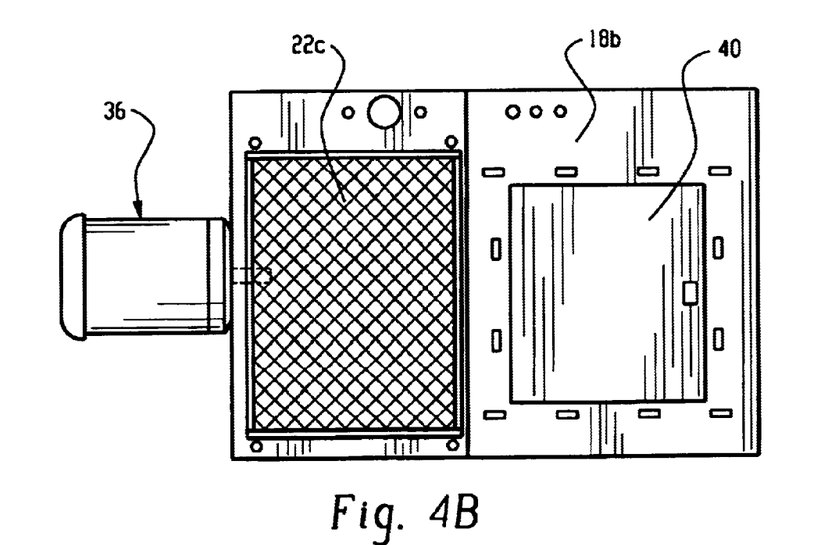

FIGS. 4A and 4B illustrate a typical and exemplary configuration of the final filters 22 and the fan motor 36. In FIGS. 4A and 4B the wrapper 16 and cartridges 14 are omitted for clarity. In the illustrated embodiment, the motor 36 and the driven fan wheel 20 and a fan cone 62 (see below) are separate devices, however, alternatively the motor 36 may be integrally assembled with the fan wheel 20. The motor 36 is centrally mounted with a support panel 38 that can accommodate different sized motors as required. Final filters 22a and 22b are installed on the back panel 18A of the base housing 18. If a particular final filter location need not be used, the filter can be replaced with a cover panel 40. Another final filter 22C is installed on side panel 18b, and the same may be done on the opposite side panel as required (not shown).

Figure 2:
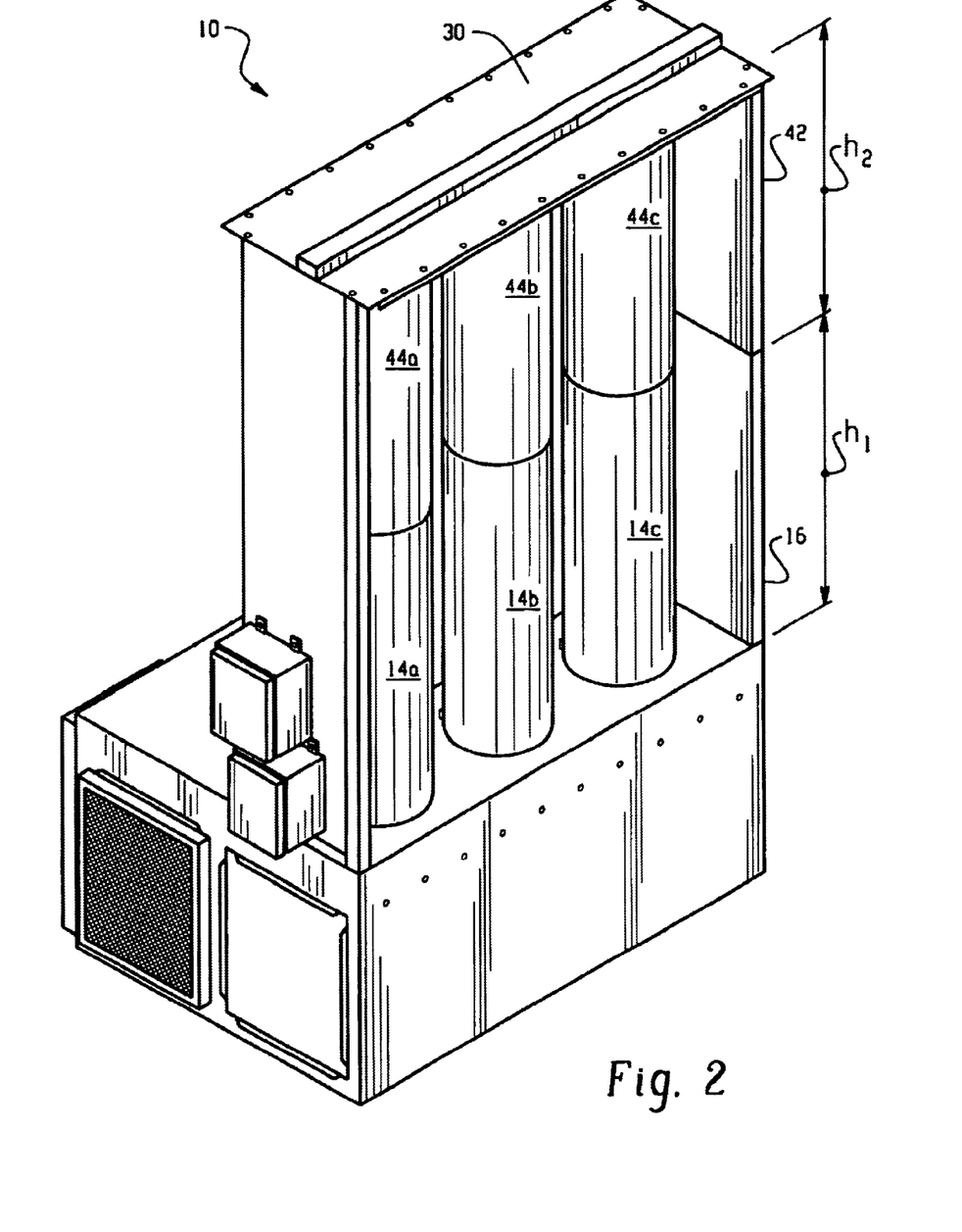
FIG. 2 is an isometric illustration of the apparatus of FIG. 1 modified to accommodate higher air flow and powder filtering using the same base housing.

With reference to FIG. 2, the powder recovery apparatus 10 has been modified to now accommodate a larger number and size of cartridge filters 14. In this example, a second wrapper 42 that generally conforms to the first wrapper 16, has been vertically stacked on top of the first wrapper 16. If the first wrapper 16 has a vertical height $h_1$, and the second wrapper has a vertical height $h_2$, the overall assembly can now accommodate a filter stack that has a height of about $h_1$ plus $h_2$. In this example of FIG. 2, this is easily realized by simply stacking additional cartridge filters 44a, 44b, 44c vertically on top of the original filters 14a, 14b and 14c (note that in FIG. 2 the third filter opening 26 is being used compared with FIG. 1). The same cover 30 can then be used to complete the assembly and hold the filters 14, 44 in place.

The relative heights $h_1$ and $h_2$ need not be the same. The second wrapper 42 need simply to conform to the upper perimeter of the first wrapper 16 so that the wrappers 42, 16 may be secured together as by bolts using the bolt holes 32. Again, any suitable way to connect the wrappers together may be used. All joints are preferably caulked or otherwise suitably sealed.

A comparison of FIGS. 1 and 2 illustrate the modular concept of the present invention. Using the same base unit 12, the filtering capacity of the apparatus 10 can easily be increased by simply adding more wrappers to increase the vertical height of the overall filter bay 17. The only assembly needed is to remove the top cover 30, stack the second wrapper 42 on top of the first wrapper 16, install the additional filters 44 as required and then re-install the top cover 30. No modification to the base housing 18 is needed. However, in the event that there is a need to increase the air flow into the base unit 12, for example, due to an increase in the spray booth size, the motor 36 and fan wheel 20 and fan cone 62 may be changed as required, as well as the use of additional final filters 22.

While FIG. 2 illustrates two wrappers and sets of vertically stacked filters, additional levels may be added as required.

Figure 5:
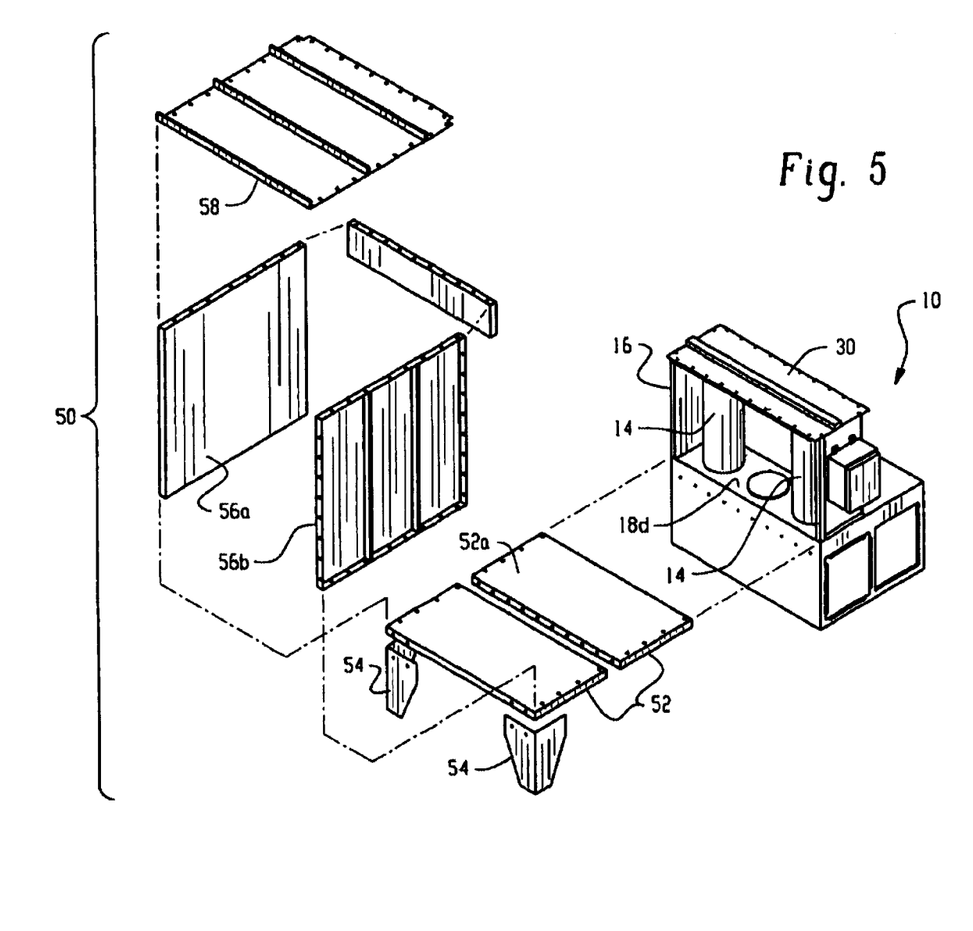
FIG. 5 is an exploded view of a spray booth used with the modular powder recovery apparatus of FIG. 1.

The spray booth 50 may be conventional in design and is illustrated in an exploded view in FIG. 5. The booth 50 typically includes a floor 52 attached on one side to the modular powder recovery apparatus 10 and supported on an opposite side by legs 54. Walls 56a, b and top 58 form a partially enclosed spray booth 50. Preferably the plane of the floor 52 upper surface 52a, is generally flush with the top portion 18d of the base housing 18. As is well known, the cartridges 14 may be cleaned by applying a reverse pulse of air through the cartridges 14 which knocks the powder to the floor 52 for collection and removal. Many different spray booth configurations may be used. The amount of air that must be drawn from the spray booth in order to contain and recover the powder overspray will determine the motor, fan, fan cone and filter sizes and quantities needed for a particular booth.

With reference to FIG. 6, an additional feature of the invention is illustrated. As the spray booth dimensions increase, for example, a larger motor 36 and fan wheel 20 may be required to pull the necessary airflow into the recovery system 10. In FIG. 6, the motor 36 drives the fan wheel 20. Heretofore, the fan wheel 20 would pull air through an inlet 60 to draw air from the spray booth through the cartridges 14, down through the opening 26 in the base housing 18 and into the base unit 12 interior. However, each time the fan wheel size changed, the base 12 had to be modified to accommodate the different airflow and also to mount the fan wheel 20 at the inlet. In order to increase the modularity of the base unit 12, a fan cone 62 is provided between the fan wheel 20 and the inlet 60. The fan cone 62 provides a standard interface between the fan wheel and the inlet 60. In other words, a standard inlet opening 60 may be used for a number of different sized fan wheels 20, simply by changing the fan cone 62. No other structural modification of the base 12 is required, and the cone 62 is easily accessible through the back end plate 38 of the base unit 12. Those skilled in the art will readily appreciate that the fan cone 62 is an option that can be used in any powder recovery apparatus, with or without the other modular features of the present invention.

Figure 7:
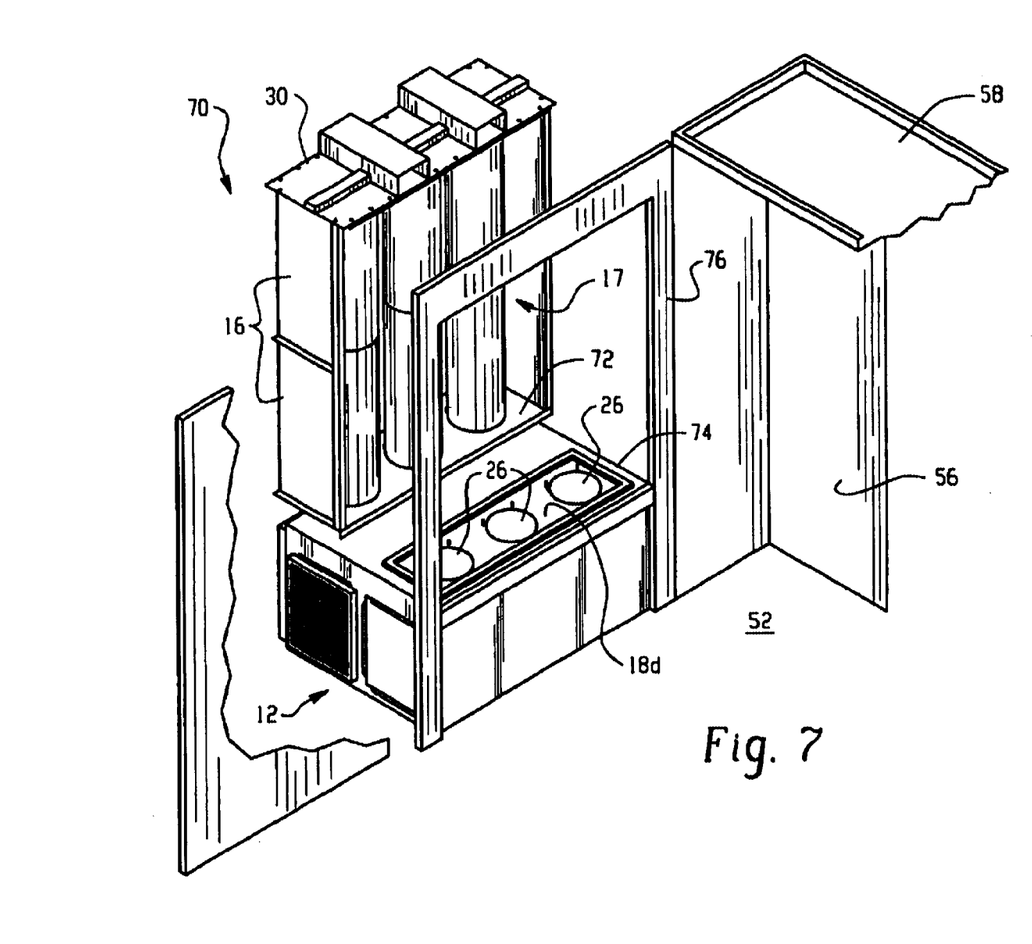
FIG. 7 illustrates an additional alternative modular feature of the invention for faster color change operations.

With reference to FIG. 7, in order to more easily facilitate color change operations, a modular cartridge assembly 70 includes one or more vertically aligned wrappers 16 as in the previous embodiments. However, the wrappers 16 and cartridges 14 are assembled together as a separable unit 70. Thus, a cover 30 and a bottom plate 72 cooperate with the wrappers 16 to form a box-like structure that supports the cartridges 14 therein. The assembly 70 can then be installed on and removed from the same base unit 12 as described hereinbefore. By being able to remove and replace the entire cartridge assembly 70 as a single unit, color changeover is greatly simplified with less problems of contamination between colors.

Because the modular color cartridge assembly 70 is intended to be an interchangeable unit, a gasket 74 is provided between the bottom plate 72 and the uppers surface 18d of the base housing 18. Any other suitable seal technique may be used as required. All other joints in the assembly 70 may be caulked or sealed as previously described.

FIG. 7 also partially illustrates the spray booth 50. From FIG. 7 it is apparent how the filter bay 17 forms an integral part of the spray booth 50 when the two structures are assembled so as to contain and filter the powder overspray generated in the booth. A mouth plate 76 is provided to provide a structural support and smooth transition between the powder recovery apparatus 10 and the spray booth 50 interior. The floor 52 may be installed generally flush with the housing surface 18d (FIG. 5) or below as in FIG. 7, or other suitable relative position as required to facility powder recovery.

Figure 8:
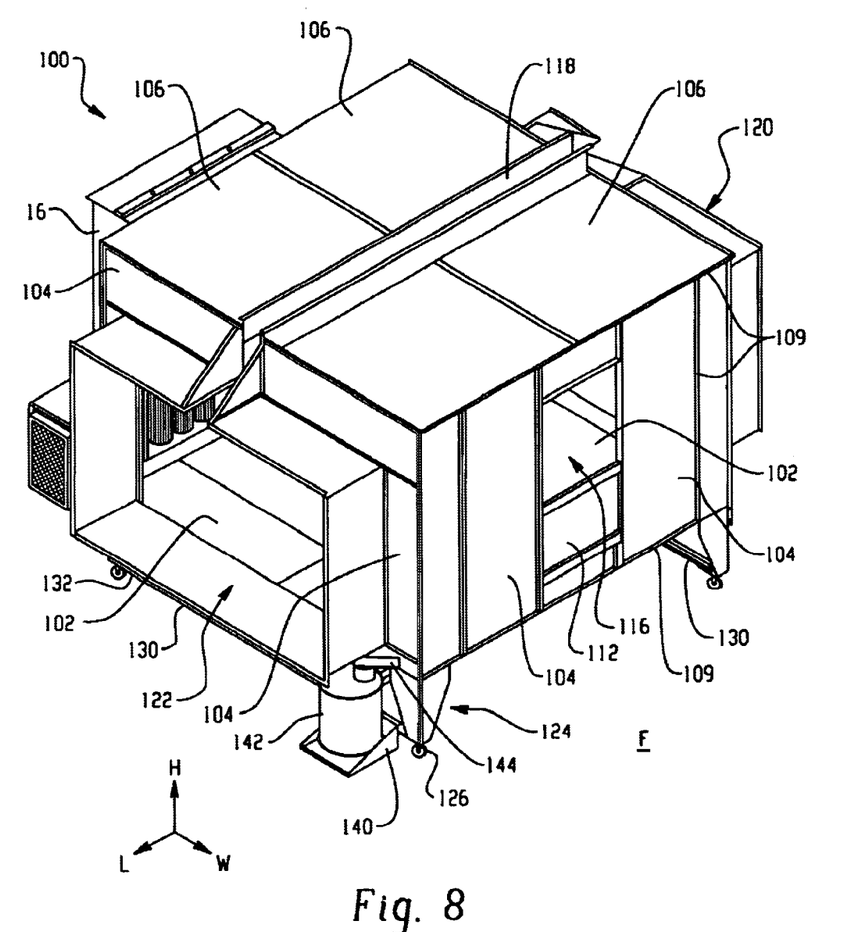
FIG. 8 is an isometric illustration of a modular spray booth in accordance with the invention.

FIG. 8 illustrates a modular spray booth 100. The modular booth 100 is composed of several interconnected panels, including floor panels 102, wall panels 104, and ceiling panels 106. These panels may be made of any material which is suitably durable and seals against powder escaping from the modular booth 100. For example, a plastic or resin such as polypropylene may in some cases be useful because it can be made transparent. This permits light to enter the booth 100 so that the spraying operator may observe the articles being sprayed, not only to spray articles by hand but also to evaluate the effectiveness of the spraying. Alternatively panels of galvanized steel may be used, for example to reduce the cost of the booth. And, panels of stainless steel may be used where exceptional durability is desired. A combination of such materials may be used, such as plastic ceiling panels 106 for light and stainless steel wall panels 104 and floor panels 102 for durability.

The panels may be formed with any shape, with a rectangular or square shape being preferred. The panels may of course be made having any convenient dimensions, taking into account the size of the articles to be sprayed, the likely needs for future expansion, and other pertinent variables. FIG. 8 shows three dimensions referenced throughout this specification: the length dimension along the L axis, the height dimension along the H axis, and the width dimension along the W axis.

Rectangular wall panels 104 having a length of 30 or 60 inches have been found to be most convenient for many applications. This permits access door panels (discussed further below) to be 60 inches wide, matching the preferred width of the filter wrapper 16. Panels as small as about 12 inches in length, though, have been envisioned. Typically, articles to be sprayed are large enough that increases in booth 100 size in increments of less than 12 inches would not be useful. The height of the wall panels 104 may be dictated principally by the size of the articles being sprayed, also considering limitations imposed by the modularity of the wrapper 16. The width of the booth, like the height, normally is dictated principally by the size of the articles being sprayed.

The various panels 102, 104 and 106 are interconnected using any one of several methods. The interconnection should physically hold adjacent panels together, as well as seal against escape of powder from inside the modular booth 100. One of ordinary skill in the art will know of several ways to accomplish both goals in such as way that the panels may be separated without significantly damaging the panels. For example, an appropriate seal may be achieved by welding panels together, placing caulk between panels, or some other suitable method. Although the seal may, by itself, be strong enough to physically hold adjacent panels together, it is preferred that some further physical interconnection be provided to ensure the booth 100 does not fall apart.

Figure 9:
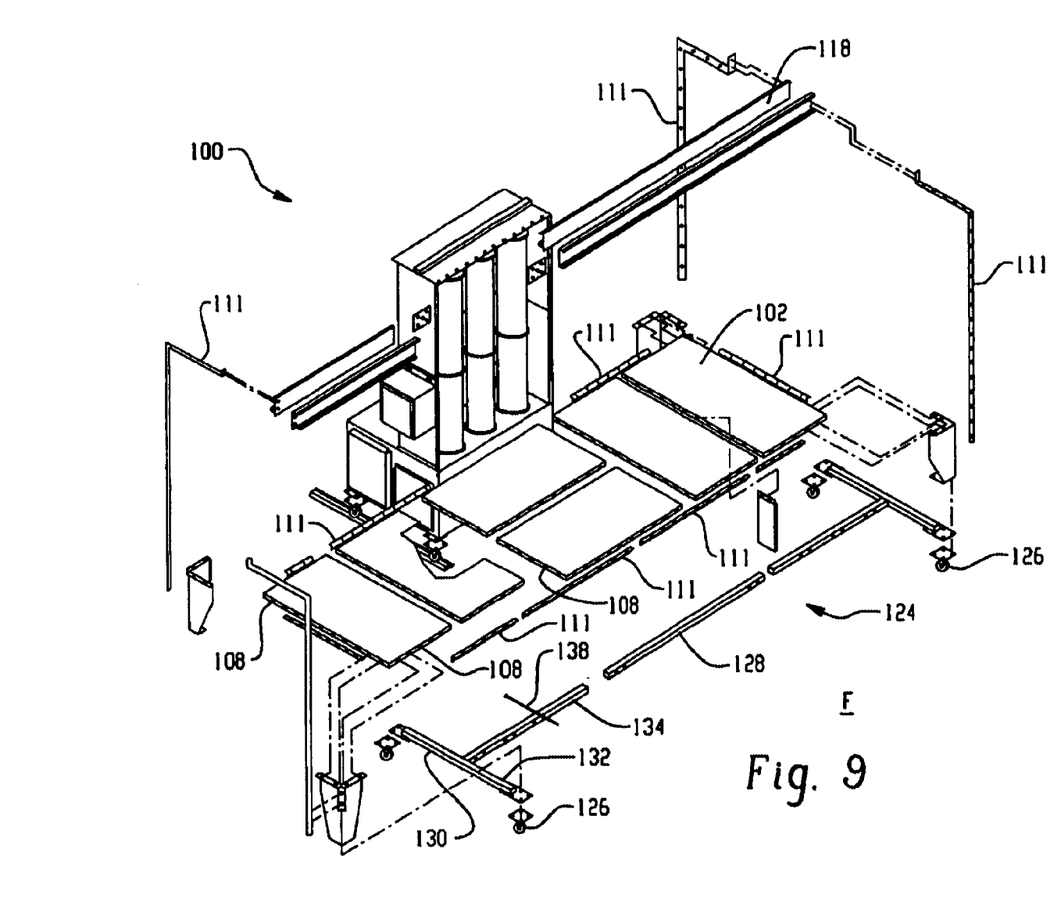
FIG. 9 is an assembly illustration of a modular spray booth in accordance with the invention.

Two suitable physical interconnection methods are disclosed here, but there are of course many others which will be known to one of ordinary skill in the art. In the first embodiment, panels 102, 104 and 106 may be interconnected with bolts inserted into mating bolt holes 108 of adjacent panels and secured with nuts. The panels may be provided with flanges 109 about their periphery, as shown in FIG. 8, for placing of the bolt holes 108 so that the panels may be directly bolted together. Alternatively, a bracket 111 may be placed between adjacent panels, as shown in FIG. 9, so that each panel is bolted to the bracket. A 90° angle bracket may be used to connect a wall panel 104 to a ceiling panel 106 or a floor panel. A T-shaped or flat bracket may be used to connect adjacent wall panels 104.

Preferably the bolt hole 108 configuration on a given side of a given panel is identical the bolt hole 108 configuration on the opposite side of that panel, both configurations being symmetrical about the panel's midpoint. This greatly facilitates both initial construction of the modular booth 100 and a later size increase, because proper installation is not dependent upon choosing which of two opposite sides is "correct" for aligning bolt holes with an adjacent panel—either side will work. One of ordinary skill in the art will appreciate there are alternative methods for achieving that goal.

Instead of bolts inserted through bolt holes 108, adjacent panels may be held together with suitable clips. This avoids the concern with obtaining proper alignment of bolt holes 108 between adjacent panels, or with a bracket 111 between panels. Such clips may, for example, be generally U-shaped members sized to extend around adjacent panel flanges 109 and be secured thereto by glue, screws, a tight fit, or other fastening agent.

The modular booth 100 preferably is not a completely enclosed structure. Access doors 112 and powder application apertures can be provided as part of a wall panel 104 to facilitate a spraying operation. For example, when the modular booth 100 is used for manual spraying operations, a wall panel 104 may be provided with operator windows 116. An operator window 116 may conveniently but not necessarily be made part of the access door 112 assembly. An operator window 116 has sufficient width and height to allow the manual spray gun operator sufficient room to direct the spray gun for completely covering the article, and to check whether such spraying thoroughly covers the article. Preferably at least two windows 116 are located on opposite sides of the modular booth for complete spray exposure, although this may alternatively be accomplished by rotating the articles being sprayed.

Spraying may be performed automatically, in which case a plurality of gun slots may be provided to permit a corresponding plurality of spray guns to extend into and be withdrawn from the modular booth 100. Such gun slots, as known in the art, generally may be larger in height but smaller in width than an operator window 116, because automatic spraying may be completed solely with up and down movement of the spray gun. Such gun slots are preferably located on opposite sides of the modular booth for complete spray exposure, although this may alternatively be accomplished by rotating the articles being sprayed. The spray guns may be of any suitable design, as would be known to one of ordinary skill in the art.

The ceiling panels 106 may be configured to provide a conveyor slot 118 extending between two opposing walls of the modular booth 100. The opposing walls respectively have an entry orifice 120 and an exit orifice 122. Articles to be sprayed may then be suspended from a conveyor in a conventional manner (not shown), to be carried into the booth 100 through entry orifice 120 and then from the booth 100 through exit orifice 122. Articles passing through the booth then may be sprayed, automatically or manually.

The modular booth 100 is supported by a support frame or base 124. In accordance with one aspect of the invention, the frame 124 is in turn supported on the floor F by a set of wheels 126, making the modular booth 100 mobile. The support frame 124 is expandable with the booth 100. In a preferred embodiment, this expansion is permitted by a telescoping center tube 128 extending between two T-shaped wheel axles 130. Wheels 126 are mounted at the ends of each lateral arm 132 of the axle 130, while the center arm 134 of the axle 130 is hollow to receive one end of the center tube 128. Alternatively, the center tube 128 may be hollow to receive the center arm 134. The wheels 126 make the booth 100 mobile, which has several uses. For example the booth 100 can be moved away from a conveyor line for cleaning or maintenance, and it can be moved between different working stations to spray different articles. Removable fasteners 138 such as pins or screws hold the center tube 128 stable with respect to each center arm 134, with a series of mating holes provided for making the attachment selectable.

The frame 124 may include an extension 140 for supporting a powder hopper 142. The powder hopper 142 stores powder for supplying the spray guns (not shown in Figures), whether manually or automatically operated. A chute 144 leads from an opening in a booth side wall or the booth floor to the powder hopper 142. This permits easy recycling of overspray which is not removed by the suction of the fan wheel 20. The booth 100 operator may enter the booth 100 and sweep such overspray from the ceiling, walls and floor into the chute 144, returning it to the powder hopper 142 for later use. The operator may use, for example, a squeegee, broom, mop or blower apparatus for sweeping the powder into the chute 144. More than one powder hopper 142 may be incorporated in the booth 100. Because the powder hopper 142 is supported by an extension 140 of the frame 124, the powder hopper 142 moves with the frame 124 and booth 100.

The process of expanding booth 100 size is straightforward. The booth's height, width and length all may be increased merely by adding additional panels. For example, the length may be increased by detaching the wall panels 104 defining the exit orifice 122 and then adding additional wall panels 104 to extend the length of the booth 100. New floor and ceiling panels 102, 106 also are added, extending between the new wall panels 104. The original wall panels 104 defining the exit orifice 122 may then be attached to the newly added panels. The booth's height or width may be increased in a similar manner. And, the booth size may be increased along more than one dimension at one time.

The frame 124 may be expanded along with the size of the booth 100. If a telescoping center tube 128 is used as part of the frame 124, an increase in length may be effected merely by repositioning the fasteners 138 in different mating holes. If the length increase is substantial, the existing telescoping center tube 128 may have to replaced with a new, longer tube (but the existing wheel axles 130 could still be used). An increase in width will likely require modification or replacement of the existing new wheel axles 130, although they may be telescoped (similar to the described center tube 128) to permit some width increase without other modification or replacement.

Figure 10:
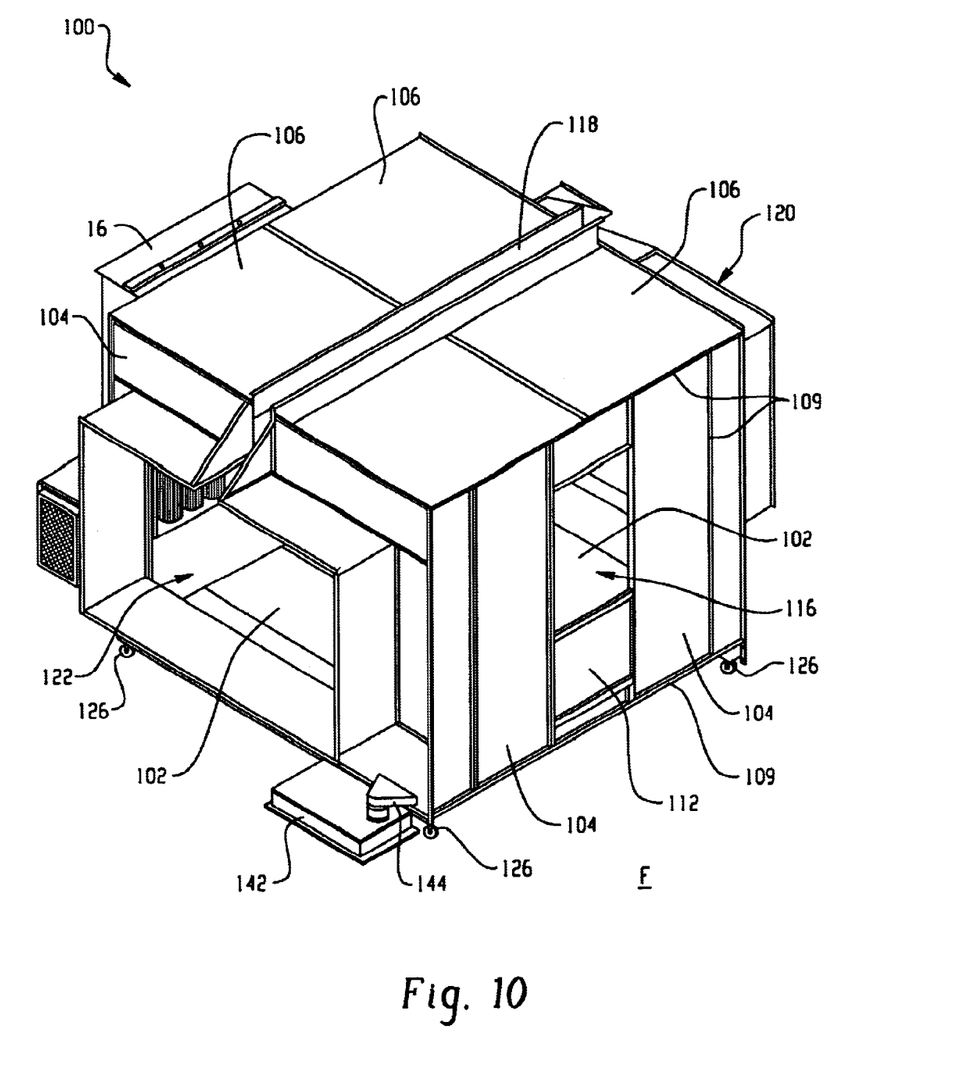
FIG. 10 is an isometric illustration of a modular spray booth in accordance with the invention.
Figure 11:
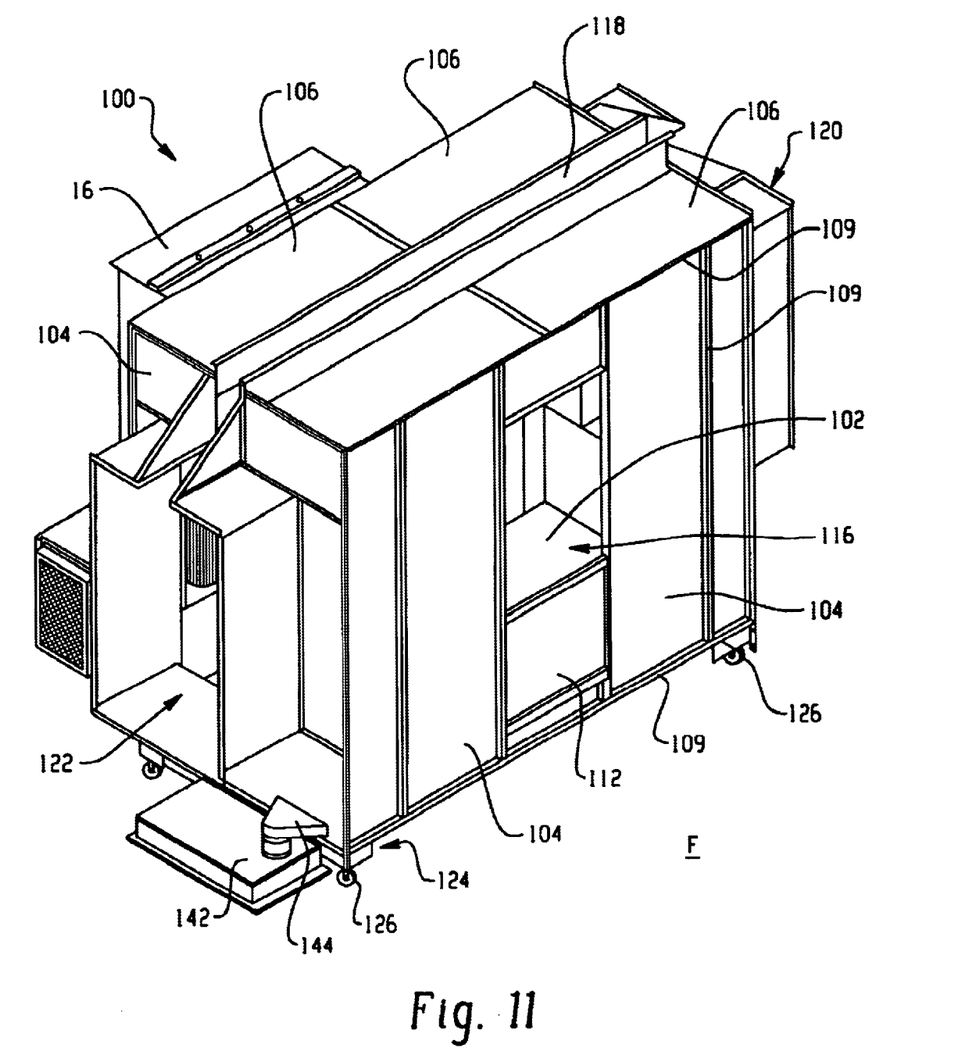
FIG. 11 is an isometric illustration of a modular spray booth in accordance with the invention.

FIG. 8 illustrates a frame 124 which supports the booth 100 so that the booth's floor panels 102 are spaced several inches above the floor F. In some applications it may be desirable for the booth floor to be closer to the floor F, as shown in FIGS. 9 and 10. For example, this can facilitate operators getting into and out of the booth 100 to perform spraying or cleaning operations.

An existing booth having a higher floor may be modified to have a lower floor by adding new wall panels 104 below the existing wall panels 104. The existing frame 124 can be replaced with a new frame, having a lower height than the existing frame, or with a series of wheels 126 supporting the booth 100 without use of a frame 124. The existing powder hopper 142 may be replaced with a new powder hopper, having a lower height, to maintain powder recycling capability.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. A modular powder spray booth comprising:

one or more ceiling panels forming a booth ceiling, two or more wall panels forming two or more booth walls and separably connected to at least one ceiling panel, one or more floor panels forming a booth floor and separably connected to at least one of the wall panels, and two adjacent panels, wherein the two adjacent panels have flanges for facilitating separable connection of the two adjacent panels.

2. The spray booth of claim 1 wherein the flanges have one or more bolt holes.

3. The spray booth of claim 1 further comprising clips, wherein the clips separably connect the two adjacent panels by extending around and being secured to the flanges.

4. The spray booth of claim 1 further comprising two adjacent panels and a bracket, wherein the bracket is placed between the two adjacent panels for facilitating separable connection of the two adjacent panels.

5. The spray booth of claim 1 further comprising a wheel assembly associated with the booth floor.

6. A modular powder spray booth comprising:

one or more ceiling panels forming a booth ceiling, two or more wall panels forming two or more booth walls and separably connected to at least one ceiling panel, one or more floor panels forming a booth floor and separably connected to at least one of the wall panels, and a powder supply canister, a powder recycling opening in the booth, and a powder recycling chute leading from the powder recycling opening to the powder supply canister.

* * * * *